US012055882B2

(12) United States Patent
Maeda

(10) Patent No.: US 12,055,882 B2
(45) Date of Patent: Aug. 6, 2024

(54) IMAGE FORMING APPARATUS, IMAGE FORMING METHOD, AND STORAGE MEDIUM

(71) Applicant: Katsuhiko Maeda, Kanagawa (JP)

(72) Inventor: Katsuhiko Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 70 days.

(21) Appl. No.: 17/965,774

(22) Filed: Oct. 14, 2022

(65) Prior Publication Data

US 2023/0127187 A1 Apr. 27, 2023

(30) Foreign Application Priority Data

Oct. 21, 2021 (JP) ................................ 2021-172453
Sep. 28, 2022 (JP) ................................ 2022-154604

(51) Int. Cl.
*G03G 15/00* (2006.01)
*G03G 15/043* (2006.01)

(52) U.S. Cl.
CPC ....... *G03G 15/5058* (2013.01); *G03G 15/043* (2013.01)

(58) Field of Classification Search
CPC ............ G03G 15/043; G03G 15/5041; G03G 15/5058; G03G 15/5062
See application file for complete search history.

(56) References Cited

U.S. PATENT DOCUMENTS

| | | | | |
|---|---|---|---|---|
| 6,249,304 | B1 | 6/2001 | Sawayama et al. | |
| 11,025,799 | B2 * | 6/2021 | Yasaki | G03G 15/043 |
| 2001/0028387 | A1 * | 10/2001 | Maeda | G06K 15/1219 347/250 |
| 2004/0070661 | A1 | 4/2004 | Maeda | |
| 2004/0095454 | A1 | 5/2004 | Maeda | |
| 2004/0160506 | A1 | 8/2004 | Maeda | |
| 2004/0239747 | A1 | 12/2004 | Maeda | |
| 2005/0184229 | A1 | 8/2005 | Maeda | |
| 2005/0200689 | A1 | 9/2005 | Shinohara et al. | |
| 2006/0045577 | A1 | 3/2006 | Maeda | |

(Continued)

FOREIGN PATENT DOCUMENTS

| | | |
|---|---|---|
| JP | 2004-098558 | 4/2004 |
| JP | 2007-155764 | 6/2007 |
| JP | 2017-203937 | 11/2017 |

OTHER PUBLICATIONS

U.S. Appl. No. 17/663,700, filed May 17, 2022, Katsuhiko Maeda.

*Primary Examiner* — Carla J Therrien
(74) *Attorney, Agent, or Firm* — Duft & Bornsen, PC

(57) ABSTRACT

An image forming apparatus includes a plurality of image bearers, a plurality of optical writing devices, a plurality of image forming units, and circuitry. The plurality of optical writing devices scan and irradiate the plurality of image bearers with a plurality of light beams according to image data to form latent images on the plurality of image bearers. The plurality of image forming units develop the latent images formed on the plurality of image bearers. The circuitry changes scanning speeds of the plurality of light beams and sets, to each of the plurality of optical writing devices, a correction value of an image misregistration on corresponding one of the plurality of image bearers caused by a change of a scanning speed of corresponding one of the plurality of light beams.

8 Claims, 15 Drawing Sheets

(56) References Cited

U.S. PATENT DOCUMENTS

| | | | |
|---|---|---|---|
| 2006/0176363 | A1 | 8/2006 | Maeda |
| 2007/0217831 | A1 | 9/2007 | Maeda |
| 2008/0273902 | A1 | 11/2008 | Maeda |
| 2009/0185816 | A1* | 7/2009 | Miyadera ........... G03G 15/0194 399/52 |
| 2011/0228030 | A1 | 9/2011 | Maeda |
| 2014/0063168 | A1 | 3/2014 | Maeda et al. |
| 2014/0072317 | A1 | 3/2014 | Shukuya et al. |
| 2015/0054902 | A1 | 2/2015 | Maeda et al. |
| 2015/0316870 | A1 | 11/2015 | Maeda |
| 2017/0031264 | A1 | 2/2017 | Honda et al. |
| 2018/0267422 | A1 | 9/2018 | Maeda |
| 2019/0163109 | A1 | 5/2019 | Maeda |
| 2021/0063909 | A1 | 3/2021 | Maeda |
| 2021/0364943 | A1* | 11/2021 | Otana .................. G03G 15/043 |
| 2022/0187753 | A1 | 6/2022 | Maeda |

* cited by examiner

IMAGE FORMING APPARATUS, IMAGE FORMING METHOD, AND STORAGE MEDIUM

CROSS-REFERENCE TO RELATED APPLICATIONS

This patent application is based on and claims priority pursuant to 35 U.S.C. § 119(a) to Japanese Patent Application Nos. 2021-172453, filed on Oct. 21, 2021, and 2022-154604, filed on Sep. 28, 2022, in the Japan Patent Office, the entire disclosure of which is hereby incorporated by reference herein.

BACKGROUND

Technical Field

Embodiments of the present disclosure relate to an image forming apparatus, an image forming method, and a storage medium.

Related Art

A color image forming apparatus, in which image light corresponding to image data is irradiated on an image bearer to form a latent image on the image bearer, the latent image is developed by a developing unit, and the developed image is transferred onto a recording sheet to form an image on the recording sheet, has been developed. In the color image forming apparatus, an image misregistration correction pattern is generated, the image misregistration correction pattern is transferred onto the image bearer, and the image misregistration correction pattern transferred onto the image bearer is detected by an optical sensor. Next, the color image forming apparatus calculates an image misregistration amount of each color with respect to the reference color based on the detection result of the image misregistration correction pattern by the optical sensor and corrects the position of the image based on the calculation result of the image misregistration amount. In addition, some technologies detect a deviation amount of an image to a process speed.

SUMMARY

In an embodiment of the present disclosure, there is provided an image forming apparatus that includes a plurality of image bearers, a plurality of optical writing devices, a plurality of image forming units, and circuitry. The plurality of optical writing devices scan and irradiate the plurality of image bearers with a plurality of light beams according to image data to form latent images on the plurality of image bearers. The plurality of image forming units develop the latent images formed on the plurality of image bearers. The circuitry changes scanning speeds of the plurality of light beams and sets, to each of the plurality of optical writing devices, a correction value of an image misregistration on corresponding one of the plurality of image bearers caused by a change of a scanning speed of corresponding one of the plurality of light beams.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
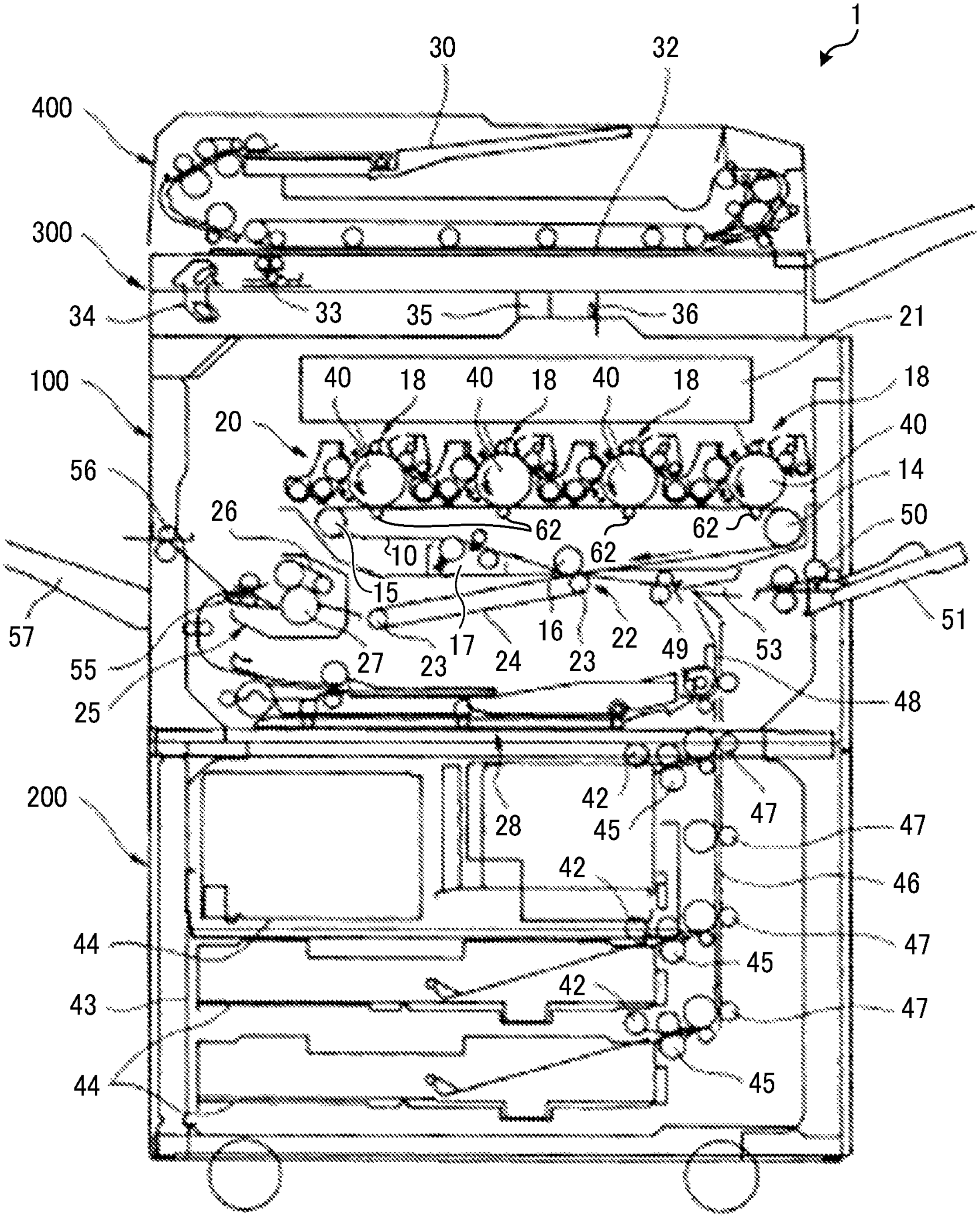
FIG. 1 is a cross-sectional view of a color image forming apparatus, according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of a color image forming apparatus to which an image forming apparatus, an image forming method, and a storage medium are applied are described below in detail with reference to the accompanying drawings.

First Embodiment

FIG. 1 is a cross-sectional view of a color image forming apparatus, according to a first embodiment of the present disclosure. As illustrated in FIG. 1, a color image forming apparatus 1 includes an intermediate transfer unit at the center thereof. The intermediate transfer unit includes an intermediate transfer belt 10 as an endless belt. The intermediate transfer belt 10 is wound around three support rollers 14 to 16 and is driven to rotate in a clockwise direction. An intermediate transferor cleaner 17 that removes residual toner remaining on the intermediate transfer belt 10 after image transfer is disposed to the right of a second support roller 15.

An image forming device 20 is provided that includes photoconductors 40, chargers 18, developing units 8, and cleaning units 9 for yellow (Y), magenta (M), cyan (C), and black (K) along a movement direction of the intermediate transfer belt 10 between the first support roller 14 and the second support roller 15. The image forming device 20 is detachable from and attachable to an apparatus body of the color image forming apparatus 1. A toner bottle of toner to be supplied to the developing unit 8 is disposed for each color. The image forming device 20 is an example of an image forming device that is disposed for each color and visualizes a latent image formed on the photoconductor 40.

A plurality of light beam scanners 21 is disposed above the image forming device 20. The plurality of light beam scanners 21 irradiates each of the photoconductors 40 of photoconductor units for the different colors with a laser beam for image formation. The light beam scanner 21 is an example of an optical writing device that forms the latent image on the photoconductor 40 (an example of an image bearer) by scanning and irradiating the photoconductor 40 with a light beam corresponding to image data. A secondary transfer unit 22 is disposed below the intermediate transfer belt 10. A secondary transfer belt 24 which is an endless belt is stretched between two rollers 23 in the secondary transfer unit 22. Accordingly, the intermediate transfer belt 10 is pushed up and pressed against the third support roller 16. The secondary transfer belt 24 transfers an image on the intermediate transfer belt 10 onto a sheet.

A fixing unit 25 that fixes a transferred image on the sheet is disposed beside the secondary transfer unit 22. The sheet on which the toner image is transferred is conveyed. A heating pressure roller 27 is pressed against a fixing belt 26 that is an endless belt in the fixing unit 25. A sheet reversing unit 28 is disposed below the secondary transfer unit 22 and the fixing unit 25. The sheet reversing unit 28 reverses the sheet immediately after an image is formed on the front side of the sheet, and conveys the sheet in order to record an image on the back side of the sheet as well.

When a document is set on a document feeding table 30 of an automatic document feeder (ADF) 400, a user operates a start switch of an operation unit so that the document is conveyed onto an exposure glass 32. When no document is set on the ADF 400, in order to read a document manually placed on the exposure glass 32, a scanner of an image reading unit 300 is driven, and a first carriage 33 and a second carriage 34 are driven to perform reading and scanning. The light is irradiated onto the exposure glass 32 from a light source on the first carriage 33. The reflected light from the document surface is reflected by the first mirror on the first carriage 33 toward the second carriage 34. The light is reflected by the mirror on the second carriage 34 to be imaged on a reading sensor 36 such as a charge-coupled device (CCD) as a reading sensor through an imaging lens 35. Recording data for each of colors Y, M, C, and K is generated based on an image signal obtained by the reading sensor 36.

The intermediate transfer belt 10 is started to be driven and rotate, and preparation for image formation of each unit of the image forming device 20 is started when a start switch is operated, when an image output is directed from, for example, a personal computer, or when an output of an image received by facsimile communication is directed. An image forming sequence of each color image is started, and an exposure laser beam modulated based on recording data for each color is emitted onto the photoconductor drum for each color. Thus, toner images of the colors Y, M, C, and K are superimposed and transferred onto the intermediate transfer belt 10 by image forming processes for the colors Y, M, C, and K to form a single toner image on the intermediate transfer belt 10.

The sheet is conveyed to the secondary transfer unit 22 such that the leading end of the sheet enters the secondary transfer unit 22 at the same time as when the leading end of the toner image enters the secondary transfer unit 22. Thus, the toner image on the intermediate transfer belt 10 is transferred onto the sheet. The sheet to which the toner image has been transferred is conveyed to the fixing unit 25, where the toner image is fixed to the sheet.

One of feed rollers 42 of a feed table 200 is selectively driven to rotate. The sheet is fed from one of sheet trays 44 disposed in multiple stages in a sheet feeder unit 43, separated by a separation roller 45, and conveyed to a conveying roller unit 46. The sheet is conveyed to a conveying roller unit 48 in a printer 100 by conveying rollers 47 and is temporarily stopped by coming into contact with a registration roller pair 49 of the conveying roller unit 48. Then, the sheet is conveyed to the secondary transfer unit 22 at the timing described above.

The sheet can be inserted onto a manual sheet tray 51. When a user inserts the sheet onto the manual sheet tray 51, the printer 100 drives to rotate a feed roller 50 to separate one of the sheets on the manual sheet tray 51 and draw the sheet into a manual feed passage 53. The drawn sheet is temporarily stopped by contacting the registration roller pair 49 in the same manner as described above.

The sheets to be ejected after the fixing process in the fixing unit 25 are guided to an ejection roller 56 by a switching claw 55 and stacked on an ejection tray 57. Alternatively, the sheet is guided to the sheet reversing unit 28 by the switching claw 55 and reversed in the sheet reversing unit 28. The sheet is guided to a transfer position again. After an image is recorded on the back side of the sheet, the sheet is ejected onto the ejection tray 57 by the ejection roller 56.

On the other hand, the intermediate transferor cleaner 17 removes residual toner from the intermediate transfer belt 10 after image transfer. Thus, the color image forming apparatus 1 is ready for the next image formation.

Figure 2:
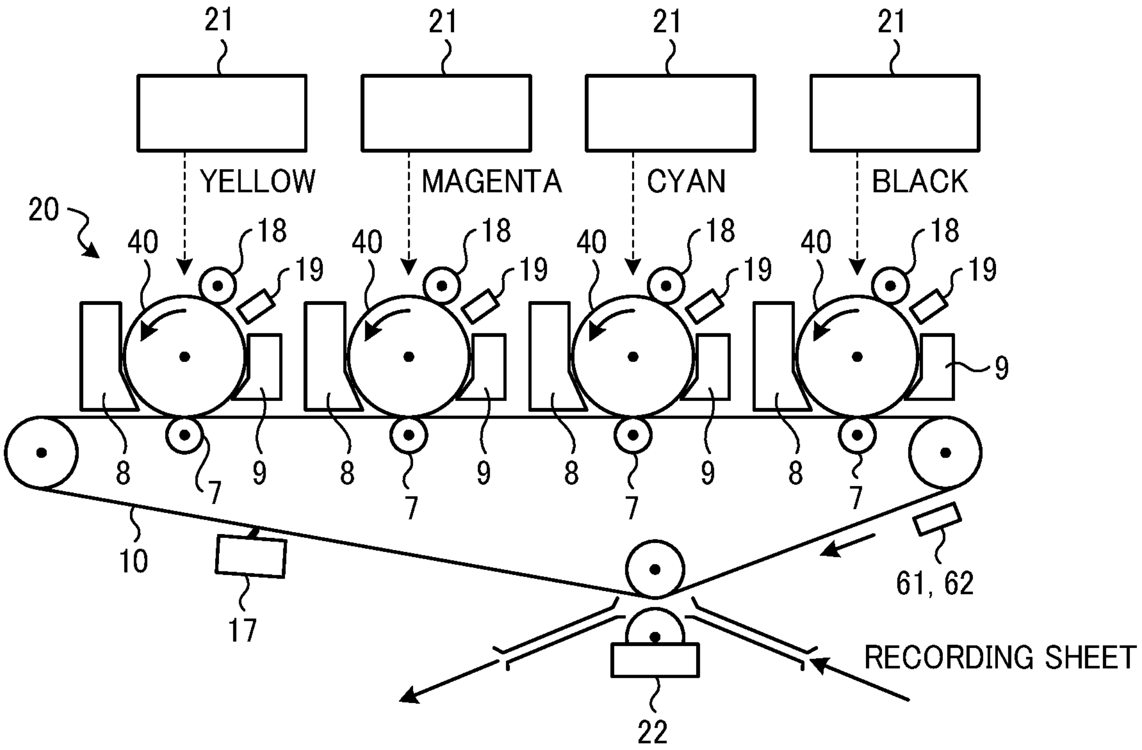
FIG. 2 is a schematic view of an image forming device disposed in the color image forming apparatus, according to the first embodiment of the present disclosure.

FIG. 2 is a schematic view of the image forming device 20 disposed in the color image forming apparatus, according to the first embodiment of the present disclosure. As illustrated in FIG. 2, the image forming device 20 according to the present embodiment includes four sets of image forming units and four sets of the light beam scanners 21 to form a color image in which images of four colors of yellow, magenta, cyan, and black are superimposed.

As will be described later with reference to FIG. 3, the light beam scanner 21 includes a laser diode (LD) unit 71 that is driven and modulated in accordance with image data to selectively emit the light beam. The emitted light beam is deflected by a polygon mirror 73 rotated by a polygon motor, reflected by a return mirror 76 via an f-O lens 74, and scanned on the photoconductor 40.

For each color, the charger 18, the developing unit 8, a transfer unit 7, the cleaning unit 9, and a static eliminator 19 are disposed around the photoconductor 40. The transfer unit 7 is an example of a transfer unit that transfers an image and an image misregistration correction pattern formed on the photoconductor 40 and the image misregistration correction pattern onto the intermediate transfer belt 10 (an example of a belt). A first color image is formed on the intermediate transfer belt 10 by charging, exposure, development, and transfer that are ordinary electrophotographic processes, and then images of a second color, a third color, and a fourth color are transferred in this order to form a color image in which images of four colors are superimposed. Further, the color image formed on the intermediate transfer belt 10 is transferred onto the sheet conveyed by the secondary transfer unit 22. As a result, the color image in which four color images are superimposed can be formed on the sheet. The color image formed on the sheet is fixed on the sheet by a fixing device. Residual toner on the intermediate transfer belt 10 is removed by the intermediate transferor cleaner 17.

As is described below, the image forming device 20 is provided with a first sensor 61 and a second sensor 62 that detect the image misregistration correction pattern formed on the intermediate transfer belt 10. Each of the first sensor 61 and the second sensor 62 is a reflection-type optical sensor and is an example of a detection device that detects the image misregistration correction pattern formed on the intermediate transfer belt 10. The color image forming apparatus 1 according to the present embodiment corrects the image misregistration in the main scanning direction and sub-scanning direction between the respective colors and the image magnification in the main scanning direction based on the detection results of the image misregistration correction pattern by the first sensor 61 and the second sensor 62. In addition, the color image forming apparatus 1 detects speed fluctuations of a drive system such as the photoconductor 40 and the intermediate transfer belt 10 from the detection results of the image misregistration correction pattern.

Figure 3:
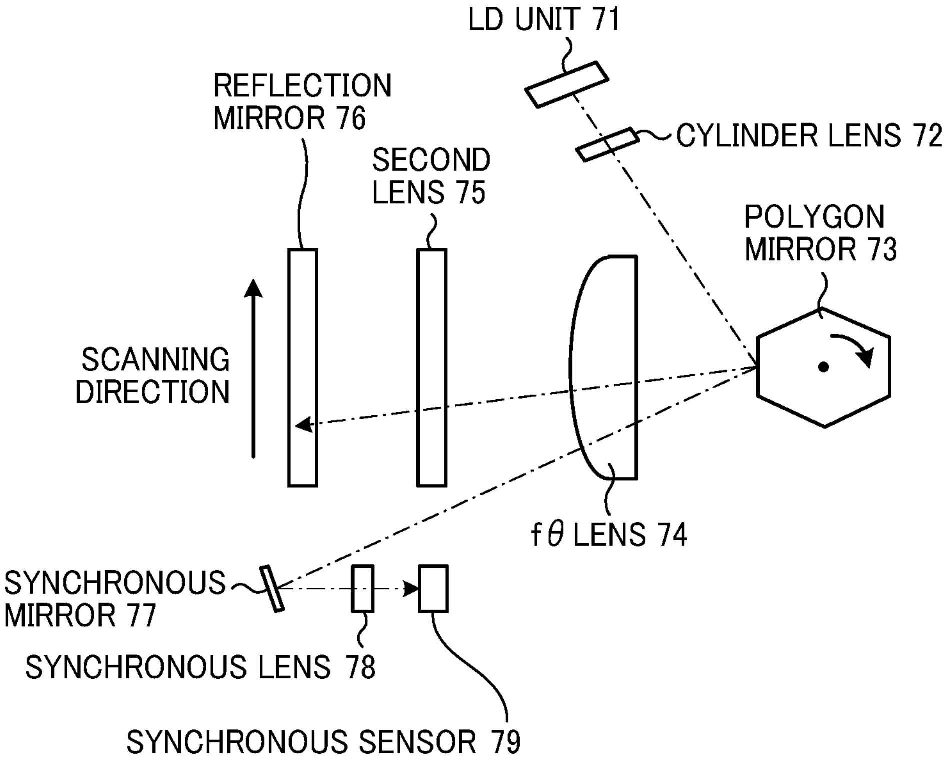
FIG. 3 is a top view of a light beam scanner disposed in the color image forming apparatus, according to the first embodiment of the present disclosure.

FIG. 3 is a top view of the light beam scanner disposed in the color image forming apparatus, according to the first embodiment of the present disclosure. The light beam scanner of each color has a common configuration illustrated in FIG. 3. In FIG. 3, a light beam from a LD unit 71 passes through a cylinder lens (CYL) 72 and enters the polygon mirror 73. The polygon mirror 73 deflects the light beam by rotation. The deflected light beam passes through the f-O lens 74, passes through a second lens 75 that corrects a beam position in the sub-scanning direction, and irradiates the photoconductor 40 by reflection of the return mirror 76. As a result, the photoconductor 40 is scanned with the light beam.

A synchronous mirror 77, a synchronous lens 78, and a synchronous sensor 79 are disposed at a writing-side end in the main scanning direction. The light beam transmitted through the f-O lens 74 is reflected by the synchronous mirror 77, is focused by the synchronous lens 78, and enters the synchronous sensor 79. The synchronous sensor 79 functions as a synchronous detection sensor for detecting a synchronous detection signal of determining a writing start timing of main scanning. Specifically, the synchronous sensor 79 is an example of a sensor that is disposed at least one on a scanning start side of the light beam emitted from the LD unit 71 and detects the light beam.

Figure 4A:
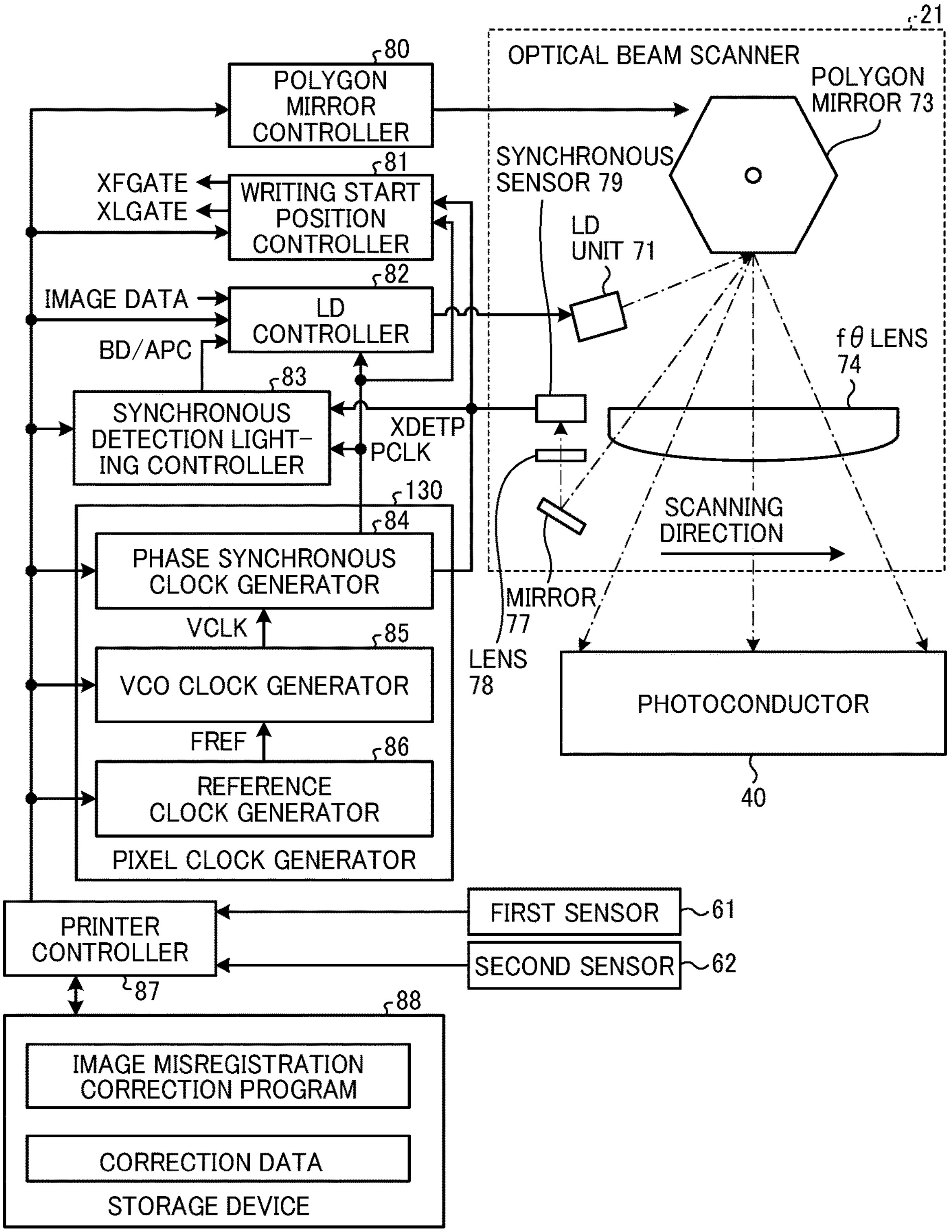
FIG. 4A is a block diagram of an image forming controller that drives the light beam scanner disposed in the color image forming apparatus, according to the first embodiment of the present disclosure.

FIG. 4A is a block diagram of an image forming controller that drives the light beam scanner disposed in the color image forming apparatus, according to the first embodiment of the present disclosure. Although FIG. 4A illustrates the image forming controller and the light beam scanner for one color, the image forming controller and the light beam scanner are disposed for each color, except for a printer controller 87 (serving as circuitry), a storage device 88, the first sensor 61, and the second sensor 62.

A synchronous sensor 79 that detects a light beam is disposed on an image writing side at an end in the main scanning direction of the light beam scanner 21 in the main scanning direction. The light beam transmitted through the f-O lens 74 is reflected by the synchronous mirror 77, is focused by the synchronous lens 78, and enters the synchronous sensor 79.

The light beam passes over the synchronous sensor 79, thereby outputting a synchronous detection signal XDETP from the synchronous sensor 79. Thus, the synchronous detection signal XDETP is supplied to a phase synchronous clock generator 84 of a pixel clock generator 130, a synchronous-detection-lighting controller 83, and a writing start position controller 81. The phase synchronous clock generator 84 of the pixel clock generator 130 generates a pixel clock PCLK synchronized with the synchronous detection signal XDETP and supplies the pixel clock PCLK to the writing start position controller 81, an LD controller 82, and the synchronous-detection-lighting controller 83.

In order to first detect the synchronous detection signal XDETP, the synchronous-detection-lighting controller 83 turns on an LD forced lighting signal BD to forcibly turn light on the LD unit 71. On the other hand, after detecting the synchronous detection signal XDETP, the synchronous-detection-lighting controller 83 uses the synchronous detection signal XDETP and the pixel clock PCLK to control lighting of the LD unit 71 at a timing at which the synchronous detection signal XDETP can be reliably detected to the extent that flare light is not generated. Upon detecting the synchronous detection signal XDETP, the synchronous-detection-lighting controller 83 generates an LD forced lighting signal BD for controlling the LD unit 71 to be turned off and supplies the LD forced lighting signal BD to the LD controller 82.

The synchronous-detection-lighting controller 83 generates a light amount control timing signal APC of each LD using the synchronous detection signal XDETP and the pixel clock PCLK and supplies the light amount control timing signal APC to the LD controller 82. The generation of the light amount control timing signal APC is executed by controlling the light amount to a predetermined light amount at a timing outside the image writing region.

The LD controller 82 performs lighting control of the LD unit 71 according to the image data synchronized with the synchronous detection forced lighting signal BD, the light amount control timing signal APC, and the pixel clock PCLK. The light beam emitted from the LD unit 71 is deflected by the polygon mirror 73, passes through the f-O lens 74 and the 5 second lens 75, and scans the photoconductor 40 by the return mirror 76.

A polygon motor controller 80 controls the rotation of the polygon motor at a predetermined number of rotations per unit time in response to a control signal from the printer controller 87. The writing start position controller 81 generates a main scanning control signal XLGATE and a sub-scanning control signal XFGATE for determining an image writing start timing and an image width based on the synchronous detection signal XDETP, the pixel clock PCLK, and the control signal from the printer controller 87.

Each of the first sensor 61 and second sensor 62 for detecting the image misregistration correction pattern supplies the detected image pattern information to the printer controller 87. The printer controller 87 calculates the misregistration of each image misregistration correction pattern and generates correction data for correcting the misregistration. The correction data is set in the writing start position controller 81 and the pixel clock generator 130 and stored in the storage device 88. In the present embodiment, when the image forming operation is performed, the correction data stored in the storage device 88 is read by the printer controller 87 and is set in the writing start position controller 81 and the pixel clock generator 130.

Figure 4B:
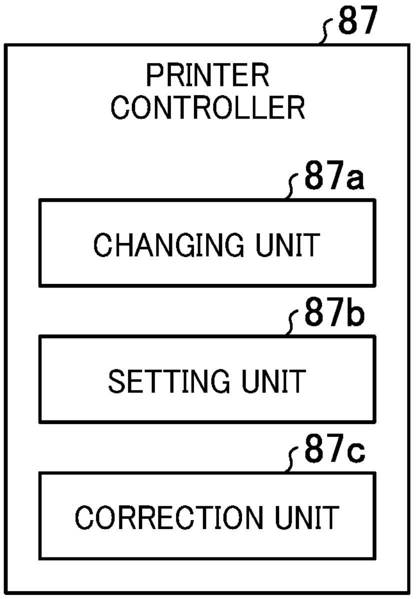
FIG. 4B is a diagram illustrating a functional configuration of a printer controller of the color image forming apparatus, according to the first embodiment of the present disclosure.

FIG. 4B is a diagram illustrating a functional configuration of the printer controller 87 of the color image forming apparatus, according to the first embodiment of the present disclosure. As illustrated in FIG. 4B, the printer controller 87 includes a changing unit 87*a*, a setting unit 87*b*, and a correction unit 87*c*. The changing unit 87*a* of the printer controller 87 functions as an example of a changing unit that changes the scanning speed of the light beam emitted from the LD unit 71. In other words, the changing unit 87*a* changes the scanning speed of the plurality of light beams. In the present embodiment, the changing unit 87*a* of the printer controller 87 changes the scanning speed when changing the speed of forming the latent image on the photoconductor 40. As a result, the misregistration of the image of each color can be reduced before printing the image. Further, the setting unit 87*b* of the printer controller 87 functions as an example of a setting unit that sets, for each color, correction data (an example of a correction value) to correct the misregistration of an image on the photoconductor 40 caused by a change in the scanning speed of the light beam. In other words, the setting unit 87*b* sets the correction data for each of the plurality of light beam scanners 21. As a result, since the misregistration of writing start reference positions of all colors caused by the change of the scanning speed of the light beam can be corrected, the misregistration of images when the scanning speed of the light beam is changed by the change of the printing speed can be reduced. In a case where two or more light beam scanners 21 among the plurality of light beam scanners 21 use the synchronous detection signal output from one synchronous sensor 79, the two or more light beam scanners 21 may use the same value as the first setting value regarding at least the writing start position in the main scanning direction among the correction data.

In the present embodiment, the correction unit 87*c* of the printer controller 87 determines the writing start reference position of the latent image with respect to the photoconductor 40, based on the synchronous detection signal (an example of a detection signal) XDETP output from the synchronous sensor 79. The correction unit 87*c* of the printer controller 87 functions as an example of a correction unit that corrects the misregistration of the image of each color with respect to the image of the reference color (for example, black), based on the detection result of the image misregistration correction pattern and the correction data. Specifically, the correction unit 87*c* corrects the misregistration of the image formed by each of the other light beam scanners 21 with respect to the image formed by the light beam scanner 21 that has formed the reference image misregistration correction pattern among the plurality of light beam scanners 21. In the present embodiment, the correction unit 87*c* of the printer controller 87 determines the writing start reference position of the latent image with respect to the photoconductor 40 based on the synchronous detection signal XDETP output from the synchronous sensor 79. The correction unit 87*c* of the printer controller 87 calculates the correction data based on a delay time from when the light beam enters the synchronous sensor 79 to when the synchronous detection signal XDETP is output from the synchronous sensor 79. As a result, the misregistration of the image in the main scanning direction can be reduced.

The printer controller 87 may calculate the speed fluctuation of the photoconductor 40 and the intermediate transfer belt 10 from a pattern interval of the image misregistration correction patterns detected by the first sensor 61 and the second sensor 62, and display the information on, for example, an operation panel. Descriptions of a calculation method of the speed fluctuations of the photoconductor 40 and the intermediate transfer belt 10 and a display method of the calculation result are omitted here.

Figure 4C:
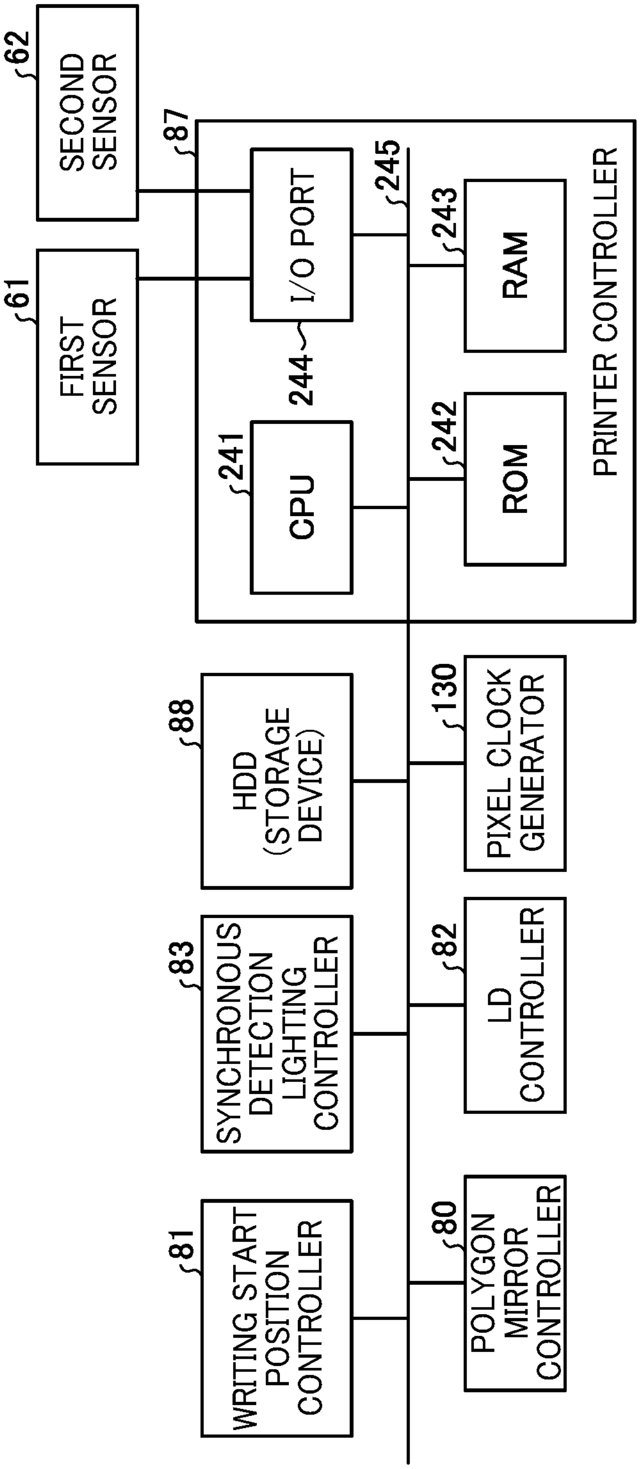
FIG. 4C is a diagram illustrating a hardware configuration of the printer controller of the color image forming apparatus, according to the first embodiment of the present disclosure.

FIG. 4C is a diagram illustrating a hardware configuration of the printer controller of the color image forming apparatus, according to the first embodiment of the present disclosure. As illustrated in FIG. 4C, the printer controller 87 includes a central processing unit (CPU) 241, a read only memory (ROM) 242, a random access memory (RAM) 243, and an input/output (I/O) port 244.

The CPU 241 is an arithmetic device that sequentially executes, e.g., branching processing or iterative processing by executing a program stored in the ROM 242. The ROM 242 is a non-volatile storage device in which a program executed in the CPU 241 is stored. The RAM 243 is a memory that functions as a work area (working area) for the operation of the CPU 241.

A bus line 245 is, e.g., an address bus or a data bus to electrically connect the components such as the CPU 241. The I/O port 244 is an interface to which output signals of the first sensor 61 and the second sensor 62 are input. The hardware configuration of the printer controller 87 is not limited to the above-described hardware configuration and may be any other hardware configuration that can implement the changing unit 87*a*, the setting unit 87*b*, and the correction unit 87*c*.

The polygon motor controller 80, the writing start position controller 81, the LD controller 82, the synchronous-detection-lighting controller 83, and the pixel clock generator 130 may be configured by an application specific integrated circuit (ASIC). The polygon motor controller 80, the writing start position controller 81, the LD controller 82, the synchronous-detection-lighting controller 83, and the pixel clock generator 130 may be configured by a single ASIC or a plurality of ASICs. The polygon motor controller 80, the writing start position controller 81, the LD controller 82, the synchronous-detection-lighting controller 83, and the pixel clock generator 130 may be implemented by a hardware configuration similar to the hardware configuration implementing the printer controller 87. The storage device 88 may be executed by a non-volatile storage medium such as a hard disk drive (HDD).

Figure 5:
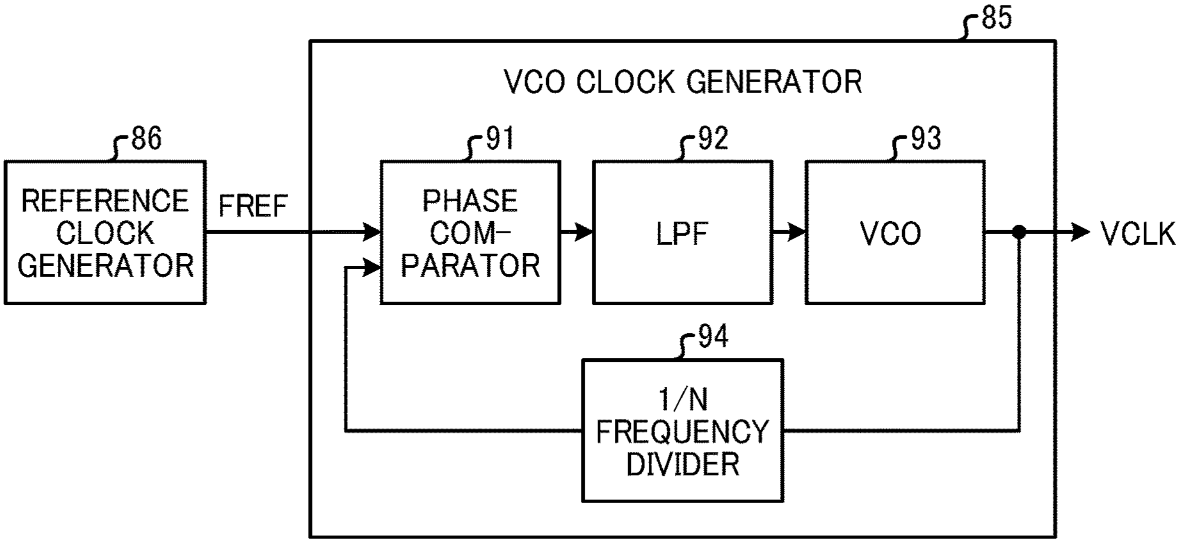
FIG. 5 is a block diagram illustrating a configuration of a voltage-controlled oscillator (VCO) clock generator of a pixel clock generator provided in the color image forming apparatus, according to the first embodiment of the present disclosure.

FIG. 5 is a block diagram illustrating a configuration of a voltage-controlled oscillator (VCO) clock generator 85 of a pixel clock generator provided in the color image forming apparatus, according to the first embodiment of the present disclosure. As illustrated in FIG. 5, the VCO clock generator 85 inputs, to a phase comparator 91, a reference clock signal FREF from a reference clock generator 86 and a signal obtained by dividing the frequency of a virtual clock (VCLK) output signal, which is an output signal from the VCO clock generator 85, by N by a 1/N frequency divider 94.

The phase comparator 91 performs phase comparison at the timing of the falling edges of the reference clock signal FREF and the VCLK output signal, and outputs an error component signal as a constant current. Unnecessary high-frequency components and noise are removed from the error component signal by a low pass filter (LPF) 92, and the resultant error component signal is supplied to a voltage-controlled oscillator (VCO) 93.

The VCO 93 oscillates oscillation frequency signals depending on the output of the LPF 92. Accordingly, the printer controller 87 can vary the frequency of the VCLK output signal by varying the frequency of the reference clock signal FREF from the reference clock generator 86 and the frequency division ratio "N". As the frequency of the VCLK output signal changes, the frequency of the pixel clock PCLK also changes.

Figure 6:
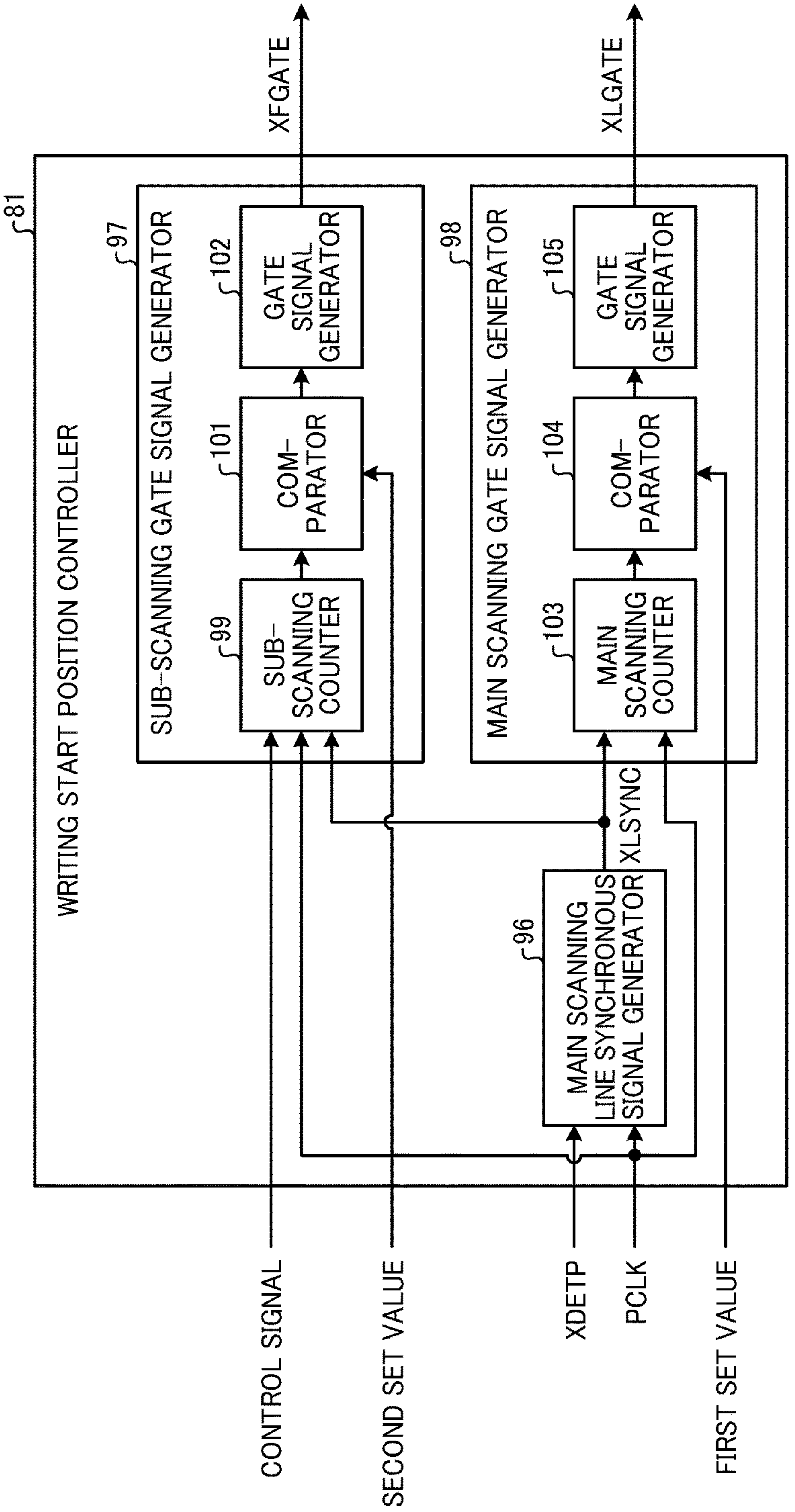
FIG. 6 is a block diagram of a writing start position controller disposed in the color image forming apparatus, according to the first embodiment of the present disclosure.

FIG. 6 is a block diagram of the writing start position controller 81 disposed in the color image forming apparatus, according to the first embodiment of the present disclosure. As illustrated in FIG. 6, the writing start position controller 81 includes a main-scanning-line synchronous signal generator 96, a main scanning gate signal generator 98, and a sub-scanning gate signal generator 97.

The main-scanning-line synchronous signal generator 96 generates an XLSYNC signal for operating a main scanning counter 103 in the main scanning gate signal generator 98 and a sub-scanning counter 99 in the sub-scanning gate signal generator 97. The main scanning gate signal generator 98 generates an XLGATE signal for determining the timing of capturing an image signal (timing of writing out an image in the main scanning direction). The sub-scanning gate signal generator 97 generates an XFGATE signal for determining the timing of capturing an image signal (timing of writing out an image in the sub-scanning direction).

The main scanning gate signal generator 98 includes a comparator 104 that compares a counter value of the main scanning counter 103 that operates based on the XLSYNC signal and the pixel clock PCLK with a first set value (correction data) from the printer controller 87. The main scanning gate signal generator 98 includes a gate signal generator 105 that generates an XLGATE signal based on a comparison result from the comparator 104.

The sub-scanning gate signal generator 97 includes the sub-scanning counter 99 and a comparator 101. The sub-scanning counter 99 operates based on the control signal (print start signal) from the printer controller 87, the XLSYNC signal, and the pixel clock PCLK. The comparator 101 compares a counter value of the sub-scanning counter 99 with a second set value (correction data) from the printer controller 87. The sub-scanning gate signal generator 97 includes a gate signal generator 102 that generates the XFGATE signal based on the comparison result from the comparator 101.

Based on the correction data stored in the storage device 88, the writing start position controller 81 corrects the writing position in the main scanning direction in units of one cycle of the pixel clock PCLK, that is, in units of one dot of the pixel clock PCLK. Based on the correction data stored in the storage device 88, the writing start position controller 81 corrects the writing position in the sub-scanning direction in units of one cycle of the XLSYNC signal, that is, in units of one line of the XLSYNC signal.

Figure 7:
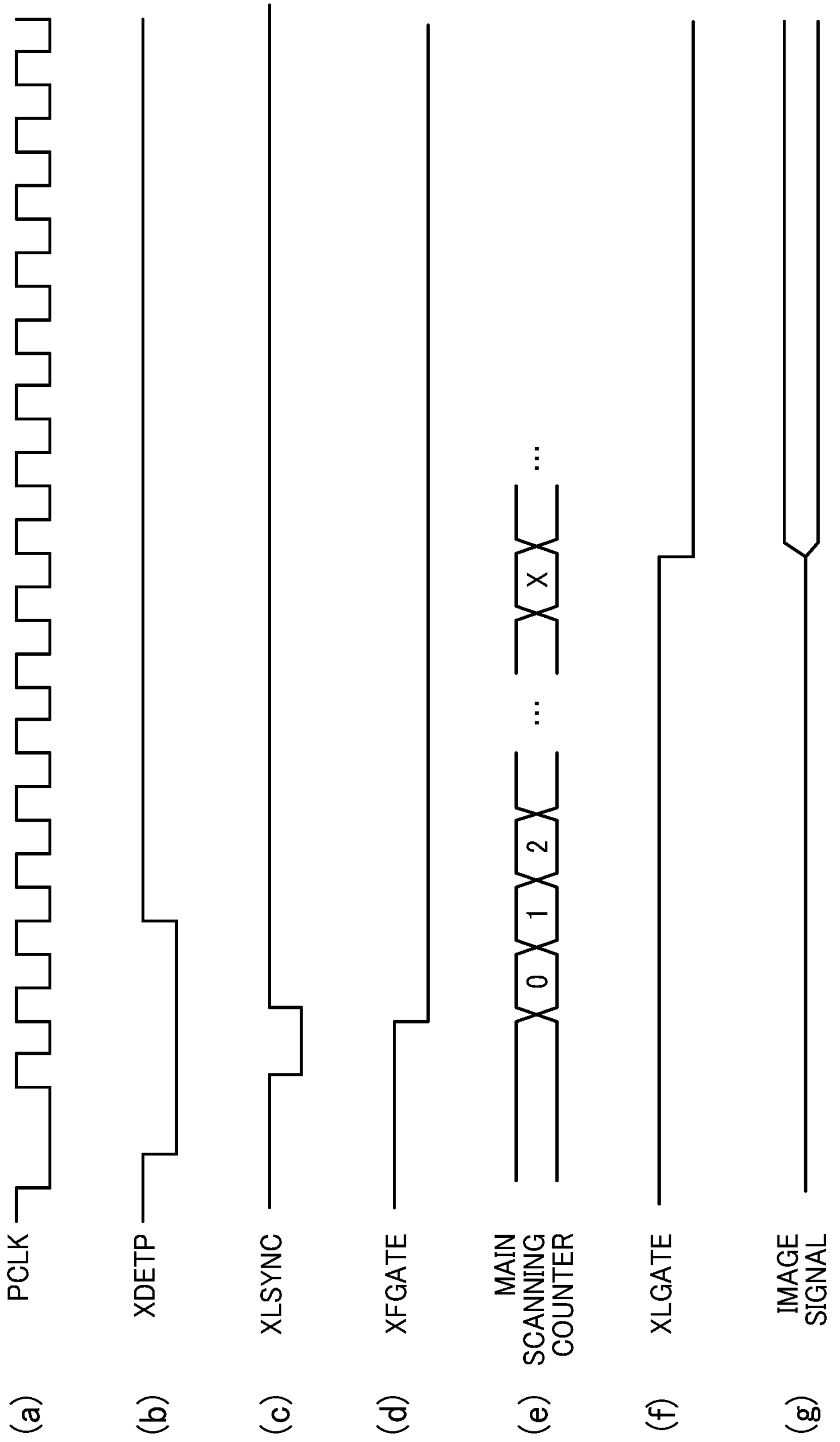
FIG. 7 is a timing chart of the writing start position control in a main scanning direction of the writing start position controller disposed in the color image forming apparatus, according to the first embodiment of the present disclosure.

FIG. 7 is a timing chart of writing start position control in the main scanning direction in the writing start position controller 81 in the color image forming apparatus, according to the first embodiment of the present disclosure. Part (a) of FIG. 7 illustrates the timing of a pixel clock PCLK. Part (b) of FIG. 7 illustrates the timing of a synchronous detection signal XDETP output from the synchronous sensor 79 when a light beam passes over the synchronous sensor 79. Part (c) of FIG. 7 illustrates the timing of an XLSYNC signal generated by the main scanning line synchronous signal generator 96. Part (d) of FIG. 7 illustrates the timing of an XFGATE signal generated by the gate signal generator 102. Part (e) of FIG. 7 illustrates a counter value of the main scanning counter 103. Part (f) of FIG. 7 illustrates the timing of an XLGATE signal generated by the gate signal generator 105. Part (g) of FIG. 7 illustrates the timing of an image signal.

In the timing chart of FIG. 7, after the counter value is reset by the XLSYNC signal illustrated in part (c) of FIG. 7, the main scanning counter 103 starts counting the pixel clock PCLK illustrated in part (a) of FIG. 7. Accordingly, each time the main scanning counter 103 counts the pixel clock PCLK, the counter value is incremented by one as illustrated in part (e) of FIG. 7. When the counter value reaches the first set value set by the printer controller 87 (in this case, the counter value of "X" illustrated in part (e) of FIG. 7), the comparator 104 outputs the comparison result. The XLGATE signal generated by the gate signal generator 105 changes to the Low level (valid) as illustrated in part (f) of FIG. 7. The XLGATE signal is a signal that changes to the Low level by the image width in the main scanning direction.

Figure 8:
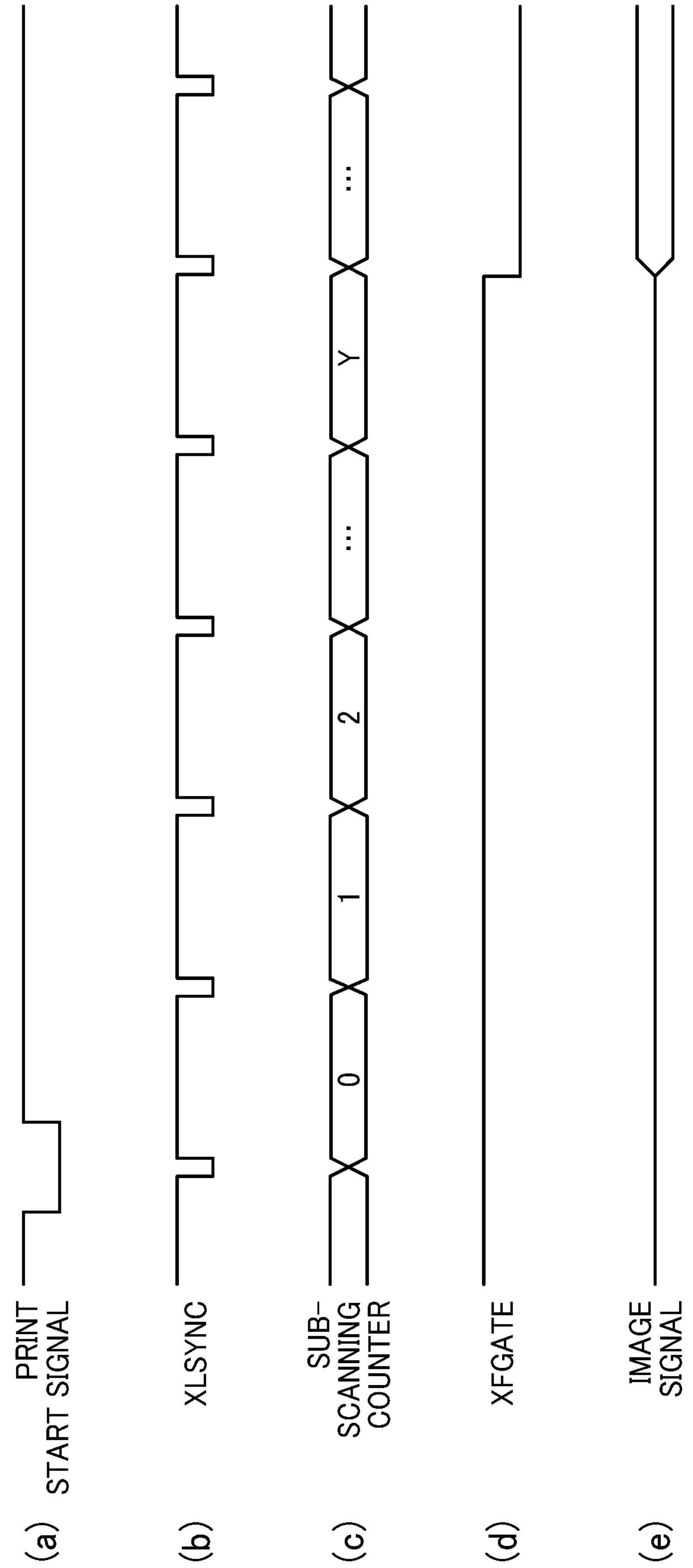
FIG. 8 is a timing chart of the writing start position control in a sub-scanning direction of the writing start position controller disposed in the color image forming apparatus, according to the first embodiment of the present disclosure.

FIG. 8 is a timing chart of the writing start position control in the sub-scanning direction of the writing start position controller disposed in the color image forming apparatus, according to the first embodiment of the present disclosure. Part (a) of FIG. 8 illustrates the timing of a print start signal. Part (b) of FIG. 8 illustrates the timing of an XLSYNC signal generated by the main scanning line synchronous signal generator 96. Part (c) of FIG. 8 illustrates a counter value of the sub-scanning counter 99. Part (d) of FIG. 8 illustrates the timing of an XFGATE signal generated by the gate signal generator 102. Part (e) of FIG. 8 illustrates the timing of an image signal.

In the timing chart of FIG. 8, after the counter value of the sub-scanning counter 99 illustrated in part (c) of FIG. 8 is reset by the print start signal from the printer controller 87 illustrated in part (a) of FIG. 8, the counter value of the sub-scanning counter 99 starts counting the XLSYNC signal generated in the main-scanning-line synchronous signal generator 96 and illustrated in part (b) of FIG. 8. As a result, each time the sub-scanning counter 99 counts the XLSYNC signal, the counter value is incremented by one as illustrated in part (c) of FIG. 8. When the counter value reaches the second set value set by the printer controller 87 (in this case, the counter value of "Y" illustrated in part (c) of FIG. 8), the comparator 101 outputs the comparison result. The XFGATE signal generated by the gate signal generator 102 changes to the Low level (valid) as illustrated in part (d) of FIG. 8. The XFGATE signal is a signal that changes to the Low level for the image length in the sub-scanning direction.

Figure 9:
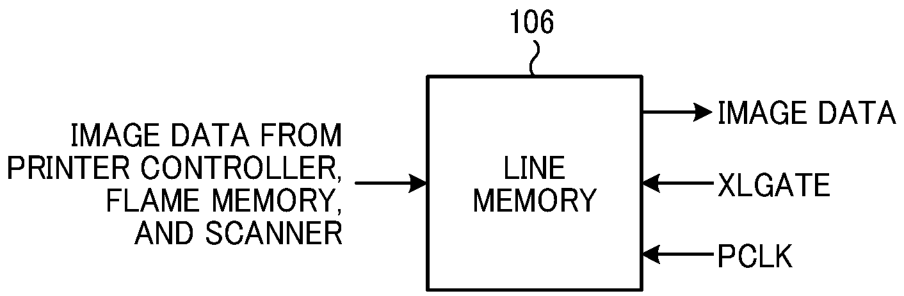
FIG. 9 is a block diagram illustrating the configuration of a preceding stage of a laser diode (LD) controller disposed in the color image forming apparatus, according to the first embodiment of the present disclosure.

FIG. 9 is a block diagram illustrating the configuration of a preceding stage of the LD controller disposed in the color image forming apparatus, according to the first embodiment of the present disclosure. As illustrated in FIG. 9, a line memory 106 is disposed in the preceding stage of the LD controller 82. The LD controller 82 uses the line memory 106 to acquire image data from, for example, a printer controller, a frame memory, or a scanner at the timing of the XFGATE signal and the XLGATE signal. The image data taken into the line memory 106 is output in synchronization with the pixel clock PCLK and supplied to the LD unit 71. As a result, a light beam is emitted from the LD unit 71.

Figure 10:
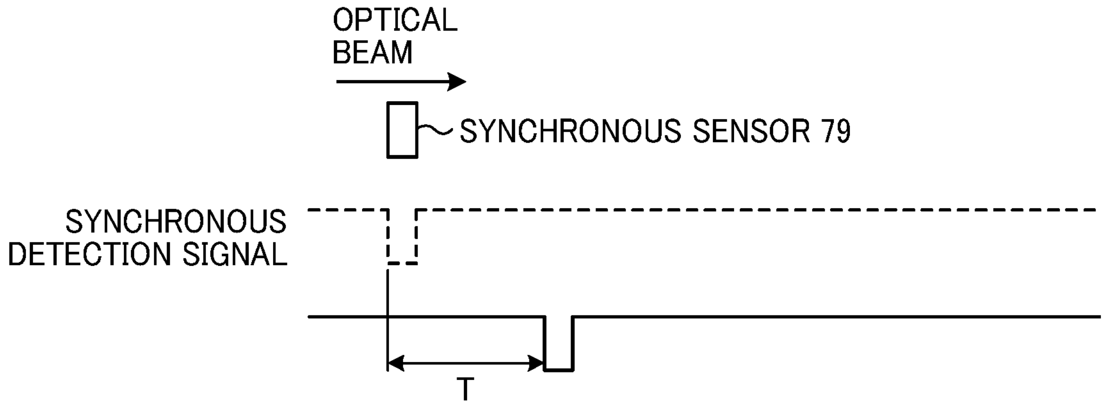
FIG. 10 is a diagram illustrating a delay time of a synchronous detection signal output from a synchronous sensor disposed in the color image forming apparatus, according to the first embodiment of the present disclosure.

FIG. 10 is a diagram illustrating a delay time of a synchronous detection signal output from the synchronous sensor 79 disposed in the color image forming apparatus, according to the first embodiment of the present disclosure. The synchronous sensor 79 outputs a synchronous detection signal when a light beam passes over the synchronous sensor 79. However, the synchronous detection signal is output with a delay time T from the sensor position of the synchronous sensor 79. In other words, the synchronous sensor 79 outputs the synchronous detection signal with a delay of the delay time T after the passage of the light beam.

This is due to, for example, the responsiveness of a photodiode constituting the synchronous sensor 79, or the delay of the internal circuit. Although the delay time T of the synchronous sensor 79 slightly varies depending on the synchronous sensor 79, the delay time T does not change depending on the scanning speed of the light beam. Accordingly, when the scanning speed of the light beam changes and the scanning time per dot (pixel clock frequency which is the frequency of the pixel clock PCLK) changes, the writing start reference position of the image changes as follows.

For example, when the delay time T is 300 nanoseconds (ns) and the scanning time per dot (or the pixel clock frequency) per dot in the case of a scanning speed A is 20 ns, the writing start reference position is a position shifted by 300 ns/20 ns=15 dots from the position of the synchronous sensor 79 is the writing start reference position. For example, when the delay time T is 300 ns and the scanning time per dot (pixel clock frequency) per dot in the case of a scanning speed B is 30 ns, the writing start reference position a position shifted by 300 ns/30 ns=10 dots from the position of the synchronous sensor 79 is the writing start reference position. Therefore, when the scanning speed of the light beam is changed from the scanning speed A to the scanning speed B, the writing start reference position is shifted by 15 dots−10 dots=5 dots. For this reason, the printer controller 87 calculates the correction data based on the delay time T.

Figure 11:
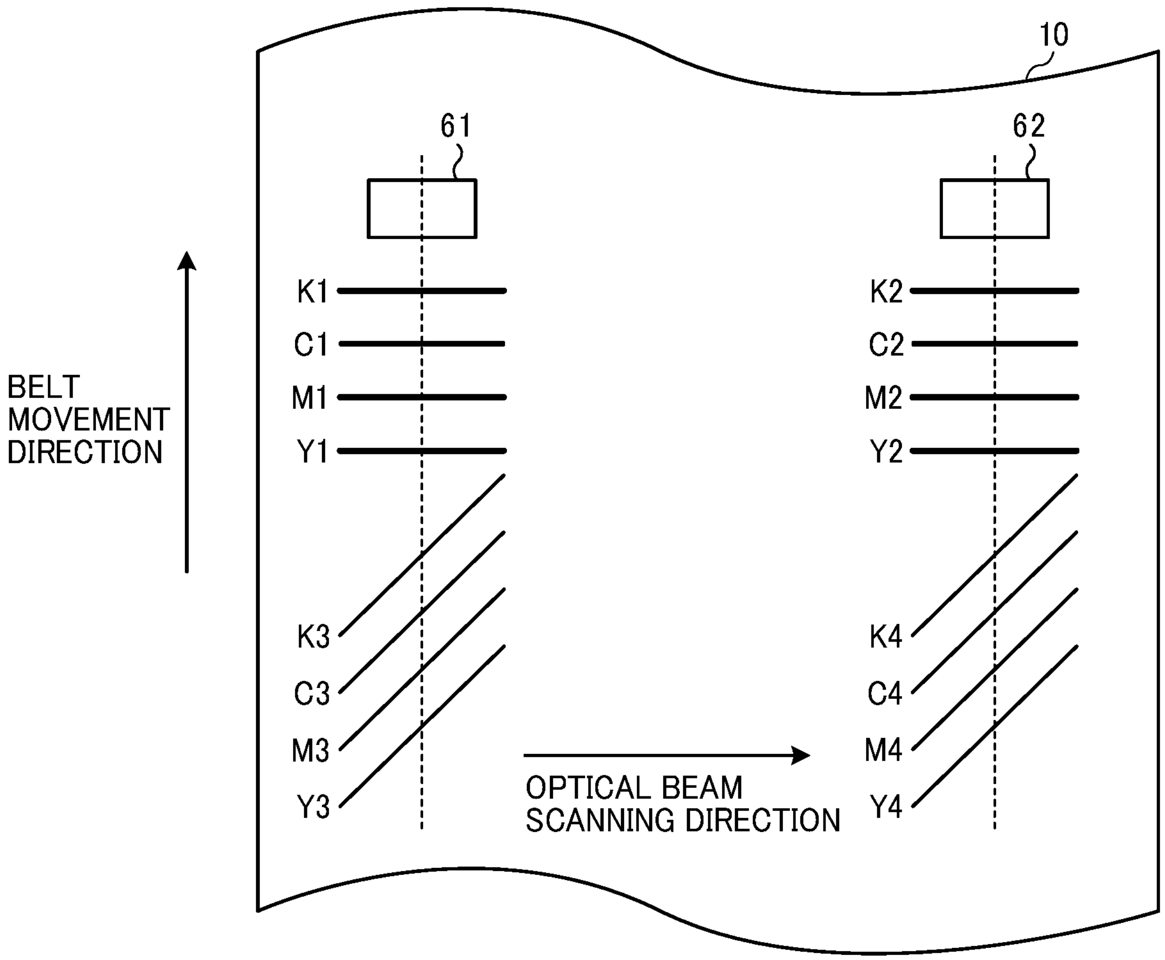
FIG. 11 is a diagram illustrating an image misregistration correction pattern formed on an intermediate transfer belt in the color image forming apparatus, according to the first embodiment of the present disclosure.

FIG. 11 is a diagram illustrating the image misregistration correction patterns formed on the intermediate transfer belt 10 in the color image forming apparatus, according to the first embodiment of the present disclosure. In the present embodiment, the image position formed by the most downstream image forming device 20 (for example, the image forming device 20 for black) in the movement direction of the intermediate transfer belt 10 is set as a reference position, and the image positions of the respective colors such as yellow, magenta, and cyan are matched.

In the present embodiment, an image misregistration correction pattern including horizontal lines and oblique lines of respective colors is formed on the intermediate transfer belt 10. When the intermediate transfer belt 10 moves in the belt movement direction (indicated by an arrow), the horizontal lines and the oblique lines of the respective colors are detected by the first sensor 61 and second sensor 62 and are sent to the printer controller 87. Thereby, deviation amounts (times) of the image misregistration correction patterns of the respective colors with respect to the image misregistration correction pattern of black are calculated. When the image position or the image magnification in the main scanning direction is shifted, the timings at which the oblique lines are detected by the first sensor 61 and the second sensor 62 are changed. In addition, when the image position in the sub-scanning direction is shifted, the timings at which the horizontal lines are detected by the first sensor 61 and the second sensor 62 are changed.

Specifically, in the main scanning direction, the printer controller 87 compares the time from an image misregistration correction pattern K1 for black to an image misregistration correction pattern K3 for black, as a reference, with the time from an image misregistration correction pattern C1 for cyan to the image misregistration correction pattern C3 for cyan, and thus, obtains a deviation time TKC13. Further, the printer controller 87 compares the time from the image misregistration correction pattern K2 for black to the image misregistration correction pattern K4 for black, as a reference, with the time from the image misregistration correction pattern C2 for cyan to the image misregistration correction pattern C4 for cyan, and thus, obtains the deviation time TKC24.

Next, since "the time TKC24−the time TKC13" is a magnification error of the cyan image with respect to the black image, preferably, the printer controller 87 corrects the pixel clock frequency by an amount corresponding to the amount of difference. The misregistration of the cyan image with respect to the black image in the main scanning direction is a value obtained by subtracting a time variation (correction amount) due to the correction of the magnification error at the position of the first sensor 61 from the time TKC13. Accordingly, the printer controller 87 changes the timing of the XLGATE signal that determines the writing start timing by an amount corresponding to the deviation amount of the misregistration. The same is applied to the other colors of magenta and yellow.

In the sub-scanning direction, when the ideal time is Tc, the time from the image misregistration correction pattern K1 for black to the image misregistration correction pattern C1 for cyan is TKC1, and the time from the image misregistration correction pattern K2 for black to the image misregistration correction pattern C2 for cyan is TKC2, the printer controller 87 calculates "((TKC2+TKC1)/2)−Tc" as the misregistration of the cyan image with respect to the black image in the sub-scanning direction. Then, the printer controller 87 changes the timing of the XFGATE signal for determining the writing start timing by an amount corresponding to the deviation amount of the misregistration. The same is applied to the other colors of magenta and yellow.

The shape of the image misregistration correction pattern is an example and is not limited thereto. In the present embodiment, the image misregistration correction patterns are formed at two positions in the sub-scanning direction. However, the positions of image misregistration correction patterns are not limited to two positions. Various errors can be reduced by arranging a plurality of sets of image misregistration correction patterns in the movement direction of the intermediate transfer belt 10 and averaging the deviation amounts of the images of the respective colors. As the reference color, any color other than black of the most downstream image forming device 20 may also be used. In the present embodiment, black is used as the reference color in consideration of matching the image positions of the monochrome images using black and the color images as much as possible.

Figure 12:
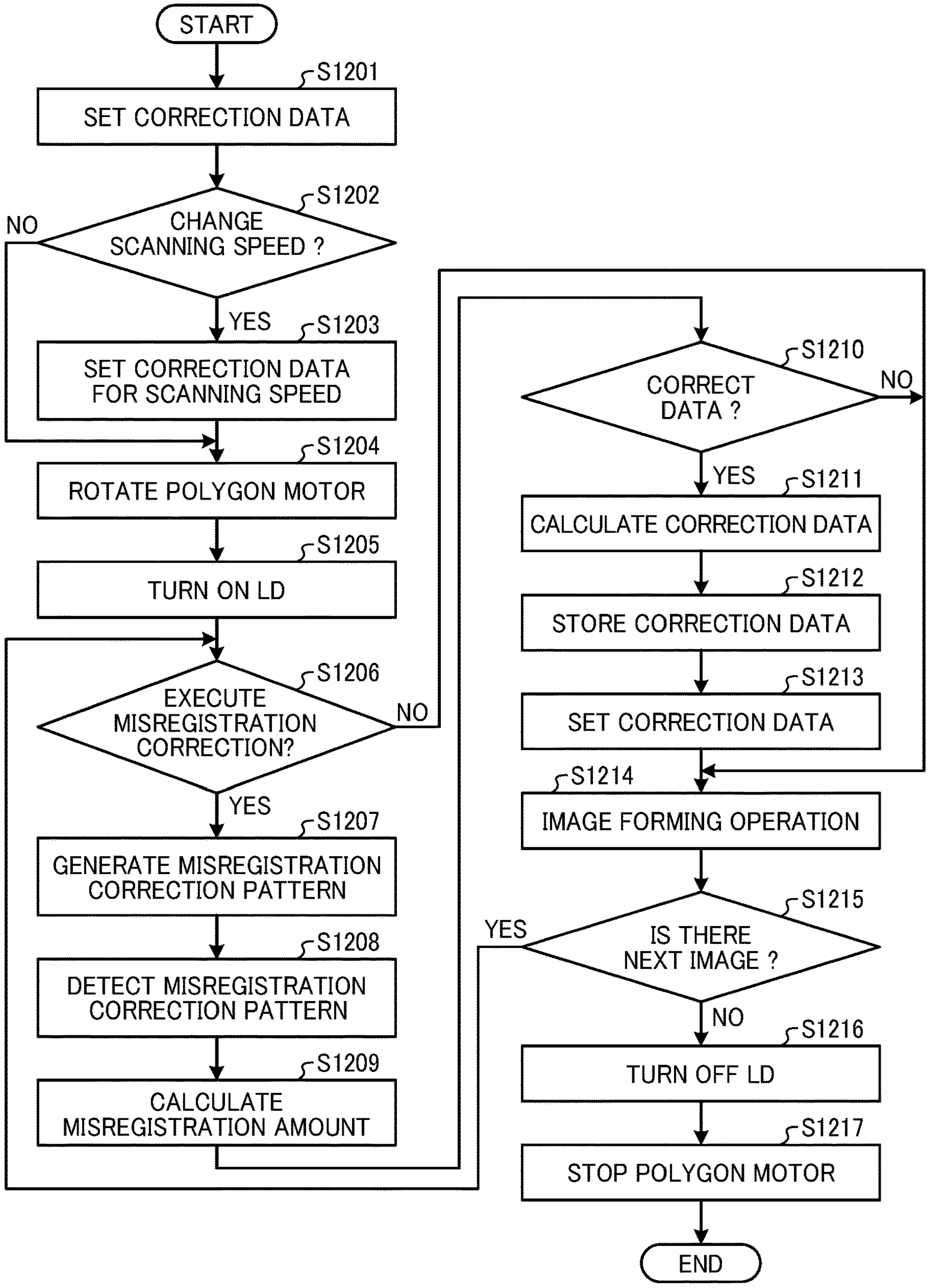
FIG. 12 is a flowchart of a correction control process of image misregistration in the color image forming apparatus, according to the first embodiment of the present disclosure.

FIG. 12 is a flowchart of a flow of correction control process of the misregistration of the image in the color image forming apparatus, according to the first embodiment of the present disclosure. When printing is started, the setting unit 87*b* of the printer controller 87 first sets the correction data of the respective colors (writing start reference positions in the main scanning direction and the sub-scanning direction, and set values of the magnification) in the respective controllers such as the writing start position controller 81, the LD controller 82, the synchronous-detection-lighting controller 83, and the pixel clock generator 130 (in step S1201 of FIG. 12). The correction data is data stored in the storage device 88.

Then, the setting unit 87*b* of the printer controller 87 checks whether there is a change in the scanning speed of the light beam (in step S1202 of FIG. 12). When the scanning speed of the light beam is changed (YES in step S1202 of FIG. 12), the printer controller 87 sets predetermined correction data for the scanning speed of each color (in step S1203 of FIG. 12). The correction data for the scanning speed includes the correction data of the writing start reference position in the main scanning direction described with reference to FIG. 10.

Next, the printer controller 87 rotates the polygon motor at a specified number of rotations per unit time based on the printing conditions (in step S1204 of FIG. 12). The printer controller 87 performs turning on the LDs to output the synchronous detection signal and an APC operation to prepare turning on each LD with a predetermined amount of light (in step S1205 of FIG. 12).

Next, the printer controller 87 checks whether to execute the misregistration correction of the image (in step S1206 of FIG. 12). The misregistration of the image occurs due to temperature change and passage of time, indicated by the number of printed sheets from the previous time, for example. Therefore, the printer controller 87 checks a predetermined execution condition (for example, whether a specified number of printed sheets has been reached since the previous execution, or whether a temperature change equal to or greater than a specified value has occurred since the previous execution).

When the executing condition is not satisfied (No in step S1206 of FIG. 12), the printer controller 87 starts the image forming operation (in step S1214 of FIG. 12). When the execution condition is satisfied (Yes in step S1206 of FIG. 12), the printer controller 87 generates (forms) the image misregistration correction pattern on the intermediate transfer belt 10 (in step S1207 of FIG. 12). The first sensor 61 and second sensor 62 detect the image misregistration correction pattern (in step S1208 of FIG. 12). Thus, the correction unit 87*c* of the printer controller 87 calculates misregistration amounts of the images of the respective colors with respect to the image of the reference color (in step S1209 of FIG. 12). When a plurality of sets of the image misregistration correction patterns are formed, the printer controller 87 calculates an average value of misregistration amounts of the respective color images in order to reduce various errors.

Then, the correction unit 87*c* of the printer controller 87 determines whether to perform the image misregistration correction of the respective colors (in step S1210 of FIG. 12). For example, if the misregistration amount is ½ or more of the correction resolution or more, the printer controller 87 determines to perform the correction. When the correction is determined to be performed (Yes in step S1210 of FIG. 12), the correction unit 87*c* of the printer controller 87 calculates the correction data (in step S1211 of FIG. 12), updates the correction data stored in the storage device 88 with the calculated correction data (in step S1212 of FIG. 12), and sets the correction data in each controller (in step S1213 of FIG. 12). The correction data includes a set value of the pixel clock frequency for determining the image magnification in the main scanning direction, a set value of the XLGATE signal for determining the image position in the main scanning direction, and a set value of the XFGATE signal for determining the image position in the sub-scanning direction. When the correction is determined not to be performed (No in step S1210 of FIG. 12), the correction unit 87*c* of the printer controller 87 does not update the correction data. After setting the correction date, the printer controller 87 performs the image forming operation using the correction data (in step S1214 of FIG. 12).

Thereafter, when there is a next image (Yes in step S1215 of FIG. 12), the process returns to step S1206. In contrast, when there is no next image (No in step S1215 of FIG. 12), the printer controller 87 turns off each LD (in step S1216 of FIG. 12), stops the polygon motor (in step S1217 of FIG. 12), and ends the process. In the present embodiment, the changing unit 87*a* of the printer controller 87 changes the scanning speed of the light beam when changing the image forming speed (printing speed) of the latent image on the photoconductor 40. In the present embodiment, when the printing speed is changed, the scanning speed of the light beam is changed according to the change in the printing speed. In some embodiments, the scanning speed of the light beam may be changed when the image magnification is changed.

Figure 13:
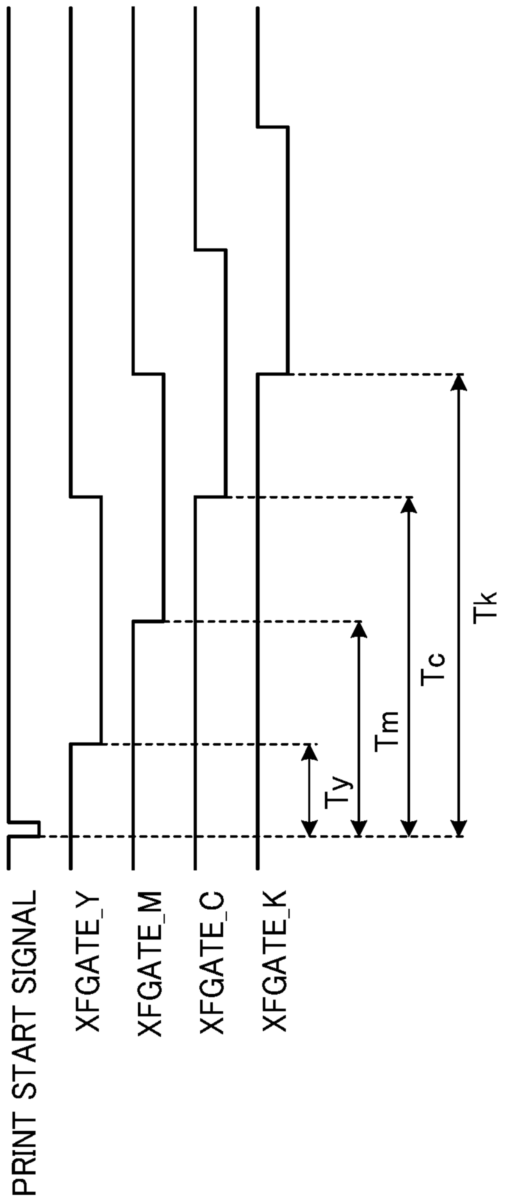
FIG. 13 is a timing chart illustrating writing start timing in the sub-scanning direction for each color in the color image forming apparatus, according to the first embodiment of the present disclosure.

FIG. 13 is a timing chart illustrating writing start timings in the sub-scanning direction for each color in the color image forming apparatus, according to the first embodiment of the present disclosure. FIG. 13 is a timing chart in which the writing start timings for the respective colors are added to the timing chart illustrated in FIG. 8.

For example, when the printing speed is “a” and the scanning speed is “A”, it is assumed that the image positions of the respective colors in the sub-scanning direction are 5 aligned by starting to write the images of the respective colors of yellow, magenta, cyan, and black at times Ty, Tm, Tc, and Tk, respectively, after the print start signal from the printer controller 87. The times Ty, Tm, Tc, and Tk each correspond to the value of “the period of the XLSYNC signal of each color×the second set value (counter value)”.

When printing is performed by changing the printing speed to "b" and the scanning speed to "B", the printer controller 87 starts writing the image of each color after a time multiplied by "a/b" so that the misregistration of the image in the sub-scanning direction does not occur. As to the scanning speed that affects the writing start time, however, an error may occur with respect to the ideal value "B" depending on the setting resolution of the scanning speed. For example, if the scanning speed is "C", a misregistration of the image occurs by an amount corresponding to the error. This is because the period of the XLSYNC signal, which varies with the scanning speed, deviates from the ideal value due to the error in the scanning speed.

In this case, the amount of misregistration to be generated is calculated from the cyclic error of the XLSYNC signal for each color and the second set value multiplied by "a/b". A new set value for correcting the amount of misregistration is calculated to set for each color. As a result, the misregistration of the image can be reduced. For example, in a case where the set value of black is preferable to be zero, subtracting the set value of black from the set value of each color can reduce the misregistration of image. In other words, the setting unit 87*b* of the printer controller 87 sets the correction data based on the difference between a specified scanning speed (for example, the scanning speed A) and an actual scanning speed (for example, the scanning speed B).

As described above, according to the color image forming apparatus 1 of the first embodiment of the present disclosure, the misregistration of the writing start reference positions of all colors caused by the change of the scanning speed of the light beam can be corrected, and therefore the misregistration of the image can be reduced when the scanning speed of the light beam is changed due to the change of the printing speed.

Second Embodiment

In a second embodiment, a direct-transfer type image forming apparatus is described as an example of the color image forming apparatus. In the following description, the description of the same components as those of the first embodiment may be omitted.

Figure 14:
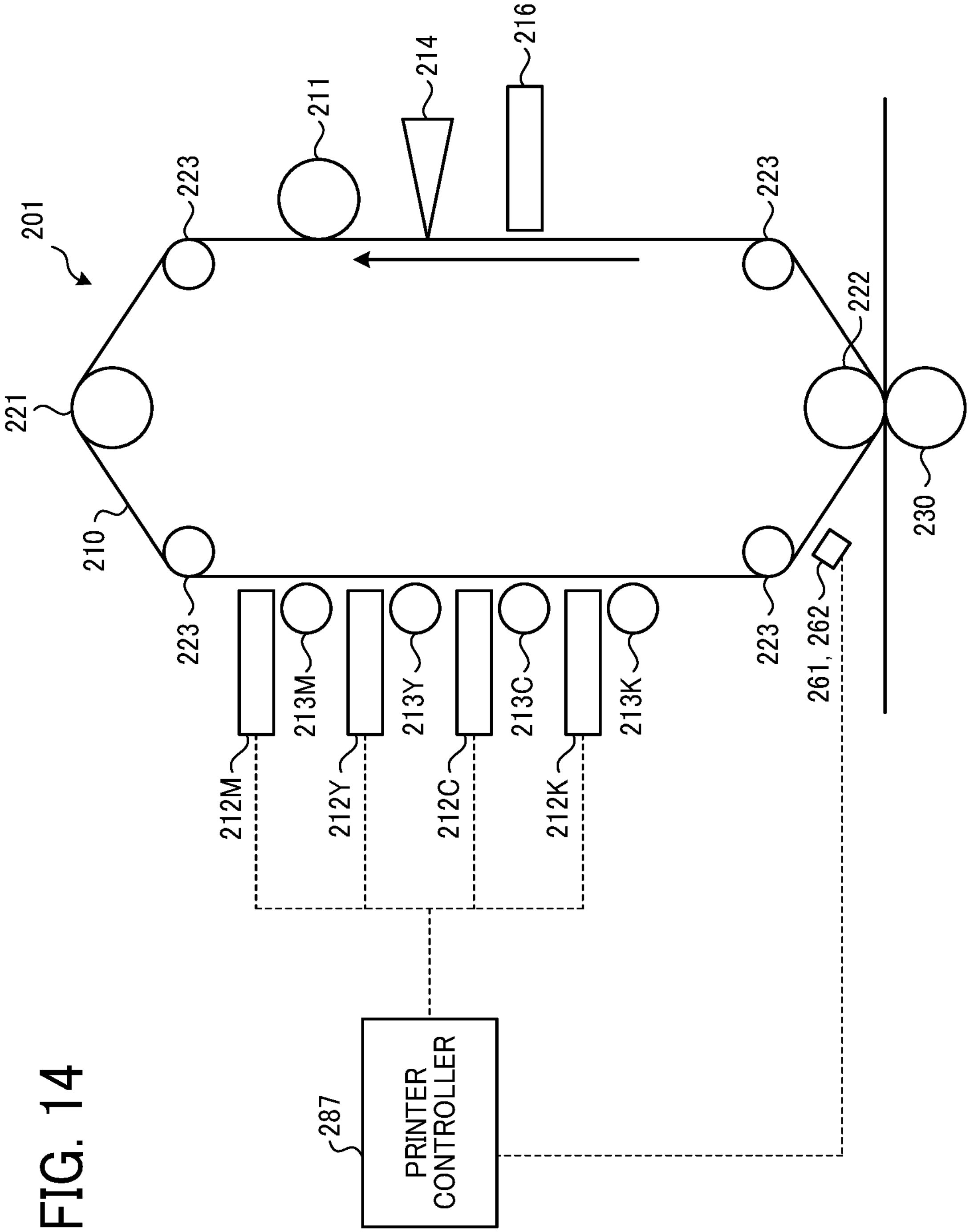
FIG. 14 is a diagram illustrating a configuration of a direct-transfer-type color image forming apparatus, according to a second embodiment of the present disclosure.

FIG. 14 is a diagram illustrating a configuration of the direct-transfer type color image forming apparatus, according to the second embodiment. As illustrated in FIG. 14, a color image forming apparatus 201 according to the second embodiment of the present disclosure is provided with a charging device 211, light beam scanners 212M, 212Y, 212C, and 212K, developing devices 213M, 213Y, 213C, and 213K, a cleaning device 214, a static eliminator 216, a transfer roller 230, a first sensor 261, and a second sensor 262 around a photoconductor belt 210.

In the color image forming apparatus 201 of the direct-transfer type, for example, a charging device 211 and a developing device 213 function as an image forming device. The image forming device herein serves as an image forming unit. In the color image forming apparatus 201, the light beam scanners 212M, 212Y, 212C, and 212K are disposed upstream from the developing devices 213M, 213Y, 213C, and 213K, respectively, in a belt conveyance direction. The light beam scanners 212M, 212Y, 212C, and 212K may be collectively referred to as the light beam scanners 212. The developing devices 213M, 213Y, 213C, and 213K may be collectively referred to as the developing device 213. The light beam scanner 212 is an example of the optical writing device.

In the color image forming apparatus 201 according the second embodiment of the present disclosure, the light beam scanners 212M, 212Y, 212C, and 212K emit laser light beams corresponding to respective colors toward the charged photoconductor belt 210, to write latent images. Then, the developing devices 213M, 213Y, 213C, and 213K develop the latent images on the photoconductor belt 210 with toners into visible toner images. The color image forming apparatus 201 repeats optical writing and development by the number of toner colors to form color images on the photoconductor belt 210. Then, the color images formed on the photoconductor belt 210 are transferred onto a sheet P at a position where the photoconductor belt 210 and the transfer roller 230 nip the sheet P therebetween.

In the color image forming apparatus 201 according the second embodiment of the present disclosure, after the color images are transferred onto the sheet P, the static eliminator 216 removes residual electrostatic charge from the surface of the photoconductor belt 210, and then the cleaning device 214 removes residual toner from the surface of the photoconductor belt 210 to clean the photoconductor belt 210. In the second embodiment of the present disclosure, the photoconductor belt 210 is stretched over a plurality of rollers 221, 222, and 223, and is driven by a driving roller 221 to rotate in a direction indicated by an arrow in FIG. 14.

In the second embodiment of the present disclosure, each of the light beam scanners 212 has a configuration as illustrated in FIG. 3. The polygon mirror 73 and the synchronous sensor 79 may be used by the plurality of light beam scanners 212. Similarly to the first sensor 61 and the second sensor 62 in the first embodiment, the first sensor 261 and the second sensor 262 are examples of detection devices that detect the correction patterns.

Similarly to the printer controller 87 in the first embodiment, a printer controller 287 (serving as circuitry) includes a changing unit 87*a*, a setting unit 87*b*, and a correction unit 87*c*. Since the hardware configuration of the printer controller 287 is substantially the same as the hardware configuration illustrated in FIG. 4C, redundant descriptions thereof are omitted.

As described above, the color image forming apparatus 201 in the second embodiment can exert substantially the same effects as the color image forming apparatus 1 in the first embodiment, even if a direct-transfer type image forming apparatus is used.

Note that in the present embodiment as described above, the image forming apparatus according to the above-described embodiment of the present disclosure is applied to a multifunction printer or multifunction peripheral (MFP) that has at least two of a photocopying function, a printing function, a scanning function, and a facsimile (FAX) function. However, no limitation is indicated thereby, and the image forming apparatus according to an embodiment of the present disclosure may be applied to any image forming apparatus such as a copier, a printer, a scanner, and a facsimile.

Each of the functions of the above-described embodiments may be executed by one or more processing circuits or circuitry. The "processing circuit" in the present specification includes a CPU programmed to execute each function by software like a processor implemented by an electronic circuit, and a device such as an application specific integrated circuit (ASIC), a digital signal processor (DSP), a field programmable gate array (FPGA), or a conventional circuit module designed to execute each function described above. For example, the polygon motor controller 80, the writing start position controller 81, the LD controller 82, the synchronous-detection-lighting controller 83, the pixel clock generator 130, and the printer controller 87 can be realized by one or a plurality of processing circuits. A plurality of controllers may be configured in one processing circuit.

Aspects of the present disclosure are, for example, as follows.

First Aspect

An image forming apparatus includes a plurality of image bearers, a plurality of optical writing devices, a plurality of image forming units, a changing unit, and a setting unit. The plurality of optical writing devices scan and irradiate the plurality of image bearers with a plurality of light beams according to image data to form latent images on the plurality of image bearers. The plurality of image forming units develop the latent images formed on the plurality of image bearers. The changing unit changes scanning speeds of the plurality of light beams. The setting unit sets, to each of the plurality of optical writing devices, a correction value of an image misregistration on corresponding one of the plurality of image bearers caused by a change of a scanning speed of corresponding one of the plurality of light beams.

Second Aspect

The image forming apparatus according to aspect 1 further includes a belt, a transfer device, a detection device, and a correction unit. The transfer device transfers an image misregistration pattern developed by the plurality of image forming units and formed on the image bearer onto the belt. The detection device detects the image misregistration correction pattern transferred on the belt. The correction unit corrects a misregistration of an image formed by a first optical writing device with respect to an image formed by a second optical writing device that has formed a reference correction pattern among the plurality of optical writing devices, based on a detection result of the image misregistration correction patterns and the correction value.

Third Aspect

In the image forming apparatus according to aspect 2, each of the plurality of optical writing devices includes a sensor configured to detect a light beam. The sensor is disposed on a scanning start side of each of the plurality of optical writing devices. The correction unit determines a writing start reference position of a latent image with respect to corresponding one of the plurality of image bearers based on a detection signal output from the sensor. The setting unit calculates the correction value based on a delay time from a time when the light beam enters the sensor to a time when the detection signal is output from the sensor.

Fourth Aspect

In the image forming apparatus according to aspect 3, two or more optical writing devices among the plurality of optical writing devices use a same value as a setting value regarding at least a writing start position in a main scanning direction, in a case where the two or more optical writing devices use the detection signal output from the sensor.

Fifth Aspect

In the image forming apparatus according to any one of aspects 1 to 4, the setting unit sets the correction value based on a difference between a specified scanning speed and an actual scanning speed of the corresponding one of the plurality of light beams.

Sixth Aspect

In the image forming apparatus according to any one of aspects 1 to 5, the changing unit changes the scanning speed when changing a speed of forming a latent image on the corresponding one of the plurality of image bearers.

Seventh Aspect

An image forming method for an image forming apparatus includes forming latent images on a plurality of image bearers with a plurality of optical writing devices by scanning and irradiating the plurality of image bearers with a plurality of light beams according to image data, developing the latent images on the plurality of image bearers with a plurality of image forming units, changing scanning speeds of the plurality of light beams, and setting, to each of the plurality of optical writing devices, a correction value of an image misregistration on corresponding one of the plurality of image bearers caused by a change of a scanning speed of corresponding one of the plurality of light beams.

Eighth Aspect

A non-transitory storage medium stores a plurality of instructions which, when executed by one or more processors, cause the processors to execute a method. The method includes forming latent images on a plurality of image bearers with a plurality of optical writing devices by scanning and irradiating the plurality of image bearers with a plurality of light beams according to image data, developing the latent images on the plurality of image bearers with a plurality of image forming units, changing scanning speeds of the plurality of light beams, and setting, to each of the plurality of optical writing devices, a correction value of an image misregistration on corresponding one of the plurality of image bearers caused by a change of a scanning speed of corresponding one of the plurality of light beams.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image forming apparatus comprising:

a plurality of image bearers;

a plurality of optical writing devices configured to scan and irradiate the plurality of image bearers with a plurality of light beams according to image data to form latent images on the plurality of image bearers;

a plurality of image forming units configured to develop the latent images formed on the plurality of image bearers; and circuitry configured to:

change a scanning speed of each light beam of the plurality of light beams, wherein scanning speed is changed in response to a change in a printing speed of the image forming apparatus; and set, to each of the plurality of optical writing devices, a correction value that corrects a start position of an image to correct an image misregistration on a corresponding one of the plurality of image bearers caused by a change of a scanning speed of the corresponding one of the plurality of light beams.

2. The image forming apparatus according to claim 1, further comprising:

a belt;

a transfer device configured to transfer, onto the belt, image misregistration correction patterns developed by the plurality of image forming units and formed on the plurality of image bearers; and a detection device configured to detect the image misregistration correction patterns on the belt, wherein the circuitry is configured to form a reference correction image using one optical writing device of the plurality of optical writing devices, and wherein the circuitry is configured to correct a misregistration of an image formed by every other optical writing device of the plurality of optical writing devices, based on a detection result of the image misregistration correction patterns and the correction value.

3. The image forming apparatus according to claim 2, wherein each of the plurality of optical writing devices includes a sensor configured to detect a light beam, wherein the sensor is disposed on a scanning start side of each of the plurality of optical writing devices, wherein the circuitry is configured to determine a writing start reference position of a latent image with respect to corresponding one of the plurality of image bearers based on a detection signal output from the sensor, and wherein the circuitry is configured to calculate the correction value based on a delay time from a time when the light beam enters the sensor to a time when the detection signal is output from the sensor.

4. The image forming apparatus according to claim 3, wherein the circuitry is configured to cause two or more optical writing devices among the plurality of optical writing devices to use a same value as a setting value regarding at least a writing start position in a main scanning direction, in a case where the two or more optical writing devices use the detection signal output from the sensor.

5. The image forming apparatus according to claim 1, wherein the circuitry is configured to set the correction value based on a difference between a specified scanning speed and an actual scanning speed of the corresponding one of the plurality of light beams.

6. The image forming apparatus according to claim 1, wherein the circuitry is configured to change the scanning speed when changing a speed of forming a latent image on the corresponding one of the plurality of image bearers.

7. An image forming method for an image forming apparatus, the method comprising:

forming latent images on a plurality of image bearers with a plurality of optical writing devices by scanning and irradiating the plurality of image bearers with a plurality of light beams according to image data;

developing the latent images on the plurality of image bearers with a plurality of image forming units;

changing a scanning speed of each light beam of the plurality of light beams, wherein scanning speed is changed in response to a change in a printing speed of the image forming apparatus; and setting, to each of the plurality of optical writing devices, a correction value that corrects a start position of an image to correct an image misregistration on a corresponding one of the plurality of image bearers caused by a change of a scanning speed of the corresponding one of the plurality of light beams.

8. A non-transitory storage medium storing a plurality of instructions which, when executed by one or more processors, cause the processors to execute a method, comprising:

forming latent images on a plurality of image bearers with a plurality of optical writing devices by scanning and irradiating the plurality of image bearers with a plurality of light beams according to image data;

developing the latent images on the plurality of image bearers with a plurality of image forming units;

changing a scanning speed of each light beam of the plurality of light beams, wherein scanning speed is changed in response to a change in a printing speed of the image forming apparatus; and setting, to each of the plurality of optical writing devices, a correction value that corrects a start position of an image to correct an image misregistration on a corresponding one of the plurality of image bearers caused by a change of a scanning speed of the corresponding one of the plurality of light beams.

* * * * *